United States Patent Office 3,382,729
Patented May 14, 1968

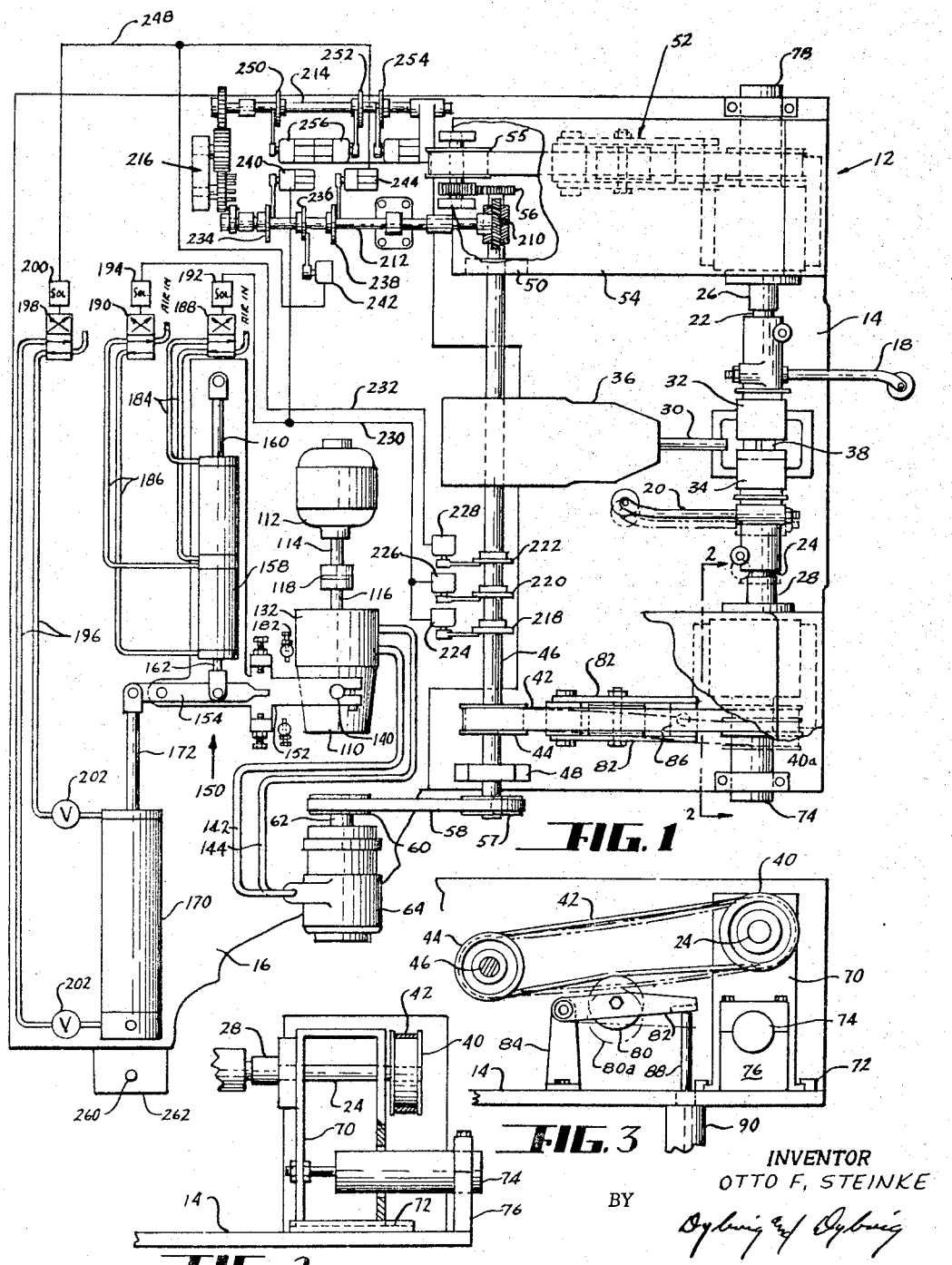

3,382,729
BELT DRIVE
Otto F. Steinke, Dayton, Ohio, assignor to The Globe Tool and Engineering Company, Dayton, Ohio, a corporation of Ohio
Filed Aug. 30, 1966, Ser. No. 576,103
4 Claims. (Cl. 74—226)

This invention relates to a belt drive and more particularly to a belt drive for use in armature or coil winding machines. The invention herein is described in association with an automatic double flier armature winding machine. However, it will be appreciated that the invention is not necessarily so limited.

The fliers of double flier armature winding machines are normally axially movable toward and away from one another to permit insertion and removal of armatures held therebetween and to permit indexing of the armature being wound. In addition, the fliers are rotated at high speeds during portions of the winding cycle and at other portions of the cycle must be stopped and started at precise locations. The driving connections to the fliers have, therefore, been relatively complex and expensive to manufacture. An object of this invention is to provide a simple and inexpensive but accurate driving connection between a rotating shaft of an armature winding machine and a flier shaft.

In accordance with this invention, the driving connection includes a simple timing belt between two timing pulleys with one of the pulleys being rigidly affixed to the flier shaft. The timing belt would tend to wear out quickly, losing its ability to accurately position the flier shaft, if it were repeatedly stretched when the flier shafts are moved axially away from one another. Accordingly, another object of this invention is to increase the useful life and accuracy of a timing belt drive assembly in which one of the pulleys may be moved relative to the other.

Other objects and advantages will become apparent from the following description.

In the drawings:

FIGURE 1 is a plan view of an armature winding machine made in accordance with this invention. In FIGURE 1 parts of the machine have been omitted, shown diagrammatically or schematically, and cut away for purposes of simplification and clarity.

FIGURE 2 is a rear elevational view of a portion of the machine of FIGURE 1 as viewed in the direction of arrows 2—2 thereof. Again parts of the machine are cut away and parts are shown in cross section.

FIGURE 3 is a side elevational view of a portion of the machine of FIGURE 1.

With reference to FIGURE 1, an armature winding machine generally designated 12 is shown including an upper support plate 14 and a lower support plate 16. The support plates 14 and 16 are mounted upon suitable standards (not shown). The mechanical operating parts of the machine 12 include a pair of fliers 18 and 20 mounted for rotation upon flier shafts 22 and 24, respectively, journalled for rotation in journals 26 and 28, respectively, mounted upon the upper support plate 14. When rotating, the fliers 18 and 20 cause wires (not shown) to be wound in coils in the slots of an armature (not shown) held by an armature adapter 30 and by a pair of chucks 32 and 34 mounted on the adjacent ends of the flier shafts 22 and 24 respectively. The armature adapter 30 is mounted upon a lead handling device 36 which is only diagrammatically shown in FIGURE 1. The armature being wound is rotated within the chucks 32 and 34 by an indexing mechanism, only a portion of which is illustrated at 38. The details of the fliers 18 and 20, the chucks 32 and 34, the lead handling device 36, and the indexing mechanism 38 disclosed herein may be entirely conventional and form no part of this invention. Such mechanisms are shown, for example, in U.S. patents to Harry W. Moore, Nos. 2,627,379 and 3,013,737 and to John M. Biddison, No. 2,670,145.

With reference to FIGURES 1, 2, and 3, a pulley 40 is fixedly mounted on the outer end of the flier shaft 24 and rotates therewith. The pulley 40 is connected by a timing belt 42 to a drive pulley 44 fixedly mounted upon a cross shaft 46 which is supported for rotation upon the upper support plate 14 in parallel relation to the flier shafts 22 and 24 by journals 48 and 50. A similar belt drive assembly, generally designated 52, connects the cross shaft 46 to the flier shaft 22. The belt drive assembly 52 is shown mostly in phantom lines, it being located beneath a safety shield 54. For reasons well known to those skilled in the art, the drive pulley 55 of the drive assembly 52 is driven by a gear assembly 56 off the cross shaft 46 so that the fliers 18 and 20 rotate in opposite directions. Fixedly mounted at one end of the cross shaft 46 is a driven pulley 57 which is connected by a timing belt 58 to a motor pulley 60 driven by the output shaft 62 of a hydraulic motor 64. As apparent, rotation of the motor output shaft 62 causes rotation of the cross shaft 46 and consequent rotation of the fliers 18 and 20 in opposite directions.

For purposes of this invention, the hydraulic system for controlling the motor 64 could be a system such as that shown in the aforementioned Moore Patent No. 3,013,737. However, the hydraulic system illustrated herein is identical to that shown in application Ser. No. 552,006 filed in the U.S. Patent Office on May 23, 1966 by myself and by Robert C. Gray and Lawrence A. Shively entitled "Hydraulic Control System." Briefly, this system includes a piston type pump 110 driven by an electric motor 112 having an output shaft 114 coupled to a pump drive shaft 116 by a flexible coupling 118. A pair of conduits 142 and 144 communicate between ports (not shown) in a valve plate section 132 of the pump 110. The rate of flow and the direction of flow of oil to the conduits 142 and 144 is determined by the rotary position of a pump speed control stem 140 projecting out of the pump 110 and connected to a yoke (not shown) therein.

As described in the aforementioned application Ser. No. 552,006, the speed control stem 140 is rotated about its axis by a pneumatically operated speed and direction control device generally designated 150, including a control lever 152 clamped to the exposed portion of the control stem 140. The low speed and direction of the pump 110 and motor 64 is controlled by a compound, double acting, pneumatic actuator 158 having two piston rods 160 and 162 projecting from the opposite ends thereof. The piston rod 160 is pivoted upon a portion of the control lever 152 and the piston rod 162 is pivotally connected to a control link 154 which in turn is pivotally mounted upon the control lever 152. The high speed control for the pump 110 and the motor 64 comprises a simple double acting, pneumatic actuator 170 having a piston rod 172 pivotally connected to the control link 154 and pivotally mounted upon the lower support plate 16. The throw of the control lever 152 in either direction is limited by stops 182. Similar stops limit the throw of the link 154 relative to the control lever 152. In FIGURE 1, the speed control stem 140 is in a "neutral" position. Retraction of the piston rod 160 would rotate the stem 140 through a small angle in a clockwise direction. Oil would then flow through the conduits 142 and 144 at a "low speed." For convenience, the direction of such oil flow may be termed "forward" and may be said to cause the fliers 18 and 20 to rotate in their forward direction. If both piston rods 160 and 162 were extended, the control stem 140 will be positioned for a "low speed reverse" drive of the fliers. A "high speed forward" direction of the wind is obtained by a retraction of both piston rods 160 and 162, as in the case of the "low speed forward," coupled with an extension of the piston rod 172. As further described in the aforementioned application Ser. No. 552,006, the actuator 170 may be repositioned upon a pivot 260 on an extension 262 of the lower support plate 16 to, in effect, reverse the high speed direction of the pump 110.

Illustrated in FIGURE 1 is a pneumatic actuator 158 connected by two pairs of air lines 184 and 186 to a "forward" air valve 188 and a "reverse" air valve 190, respectively, which are positioned by a "forward" solenoid 192 and a "reverse" solenoid 194, respectively. The high speed actuator 170 is similarly shown connected by air lines 196 to a "high speed" air valve 198 to which a "high speed" solenoid 200 is connected. In each of the air lines 196 is a variable restrictor or valve 202 which is adjustable to limit the speed with which the piston rod 172 is retracted and subsequently extended. By restricting the speed of operation of the high speed actuator 170, the rotational speeds of the fliers 18 and 20 are gradually increased and decreased between their low speed and their maximum high speed. The air valves 188, 190, and 198 are each connected to a suitable source of air under pressure (not shown).

The solenoids 192, 194, and 200 are controlled electrically by an electric circuit (not shown) having a plurality of switches operated throughout a winding cycle. The techniques of cycle controls for machines such as armature winders are highly developed and it will be appreciated that such controls for the actuators 158 and 170 can be entirely conventional. The presently preferred electric control system is one in which the rotation of the cross shaft 46 is sensed during its rotation to control the acceleration and deceleration (and stopping) of the motor 64. Since the cross shaft 46 rotates at the same speed as the fliers 18 and 20, such an electric control system is deemed to provide the most positive and reliable positioning of the fliers.

Although the electric circuitry controlling the solenoids 192, 194, and 200 is not shown, one form of cycle or sequence control is partially illustrated in association with the cross shaft 46. In FIGURE 1, the cross shaft 46 is shown connected by a worm gear assembly 210 to a coil cycle shaft 212 which drives an armature cycle control shaft 214 through a gear and ratchet mechanism 216. As already noted, the cross shaft 46 makes one complete revolution for each complete revolution of the fliers 18 and 20, or, in other words, one complete revolution for each turn of wire forming a coil. The gear ratio between the cross shaft 46 and the coil cycle shaft 212 is such that the latter shaft 212 makes one complete revolution for each coil, or pair of coils, wound. The armature cycle control shaft 214 makes one complete revolution for each complete cycle of the machine, i.e., for each armature wound.

Three cams 218, 220, and 222 on the cross shaft 46 are shown in operative relation with three cam operated switches 224, 226, and 228, respectively. An electric circuit relationship is schematically shown by a line 230 leading from the switches 224 and 226 to the "forward" solenoid 192 and an electric circuit relationship between the switch 228 and the "reverse" solenoid 194 is schematically indicated by a line 232. Similarly, three cams 234, 236, and 238 on the coil cycle shaft 212 control three switches 240, 242, and 244, respectively. The switch 240 is shown connected to the circuit line 230 while the switches 242 and 244 are connected by an electric circuit indicated by a line 248 to the "high speed" solenoid 200.

The array of switches and electric circuits described above is used in association with other switches (not shown) controlled by other operations of the machine 12. For example, operation of the index mechanism 38 can initiate a high speed forward wind by energizing both the "forward" solenoid 192 and the "high speed" solenoid 200. During the winding of the first pair of coils by the fliers 18 and 20, the switch 242 is momentarily placed under pressure by its cam 236 to trigger a high speed holding relay (not shown). About 2 or 3 turns prior to end of the winding of the first pair of coils, the switch 244 is placed under pressure and remains under pressure to deenergize the high speed solenoid 200 to reduce the flier speed. The circuit is so designed that the holding relay must be set up by the switch 242 and the switch 244 must be under pressure to deactivate the high speed actuator 170. A subsequent actuation of the index mechanism 38 drops out the holding relay to permit a high speed wind even if the switch 244 is still under pressure.

The stopping of the fliers 18 and 20 can be accomplished by the placing of the switch 240 under pressure to thereby signal the last turn by setting up another holding relay (not shown). When the switch 226 subsequently comes under pressure during the last turn, the solenoid 192 is deenergized. Thus, unless the switch 240 is under pressure, operation of the switch 226 has no effect. The switch 224 replaces the function of the switch 226 for finally stopping the fliers 18 and 20 at the end of the wind of the last pair of coils wound on an armature. One of a number of cycle switches 256 controlled by a series of cams 250, 252, and 254 on the armature cycle control shaft 214, can be used to determine whether switch 224 or switch 226 controls the stopping of the flier rotation. The switch 228 is operative, again at the signal of one of the cycle switches 256, to stop flier rotation in a reverse direction. The aforementioned Moore patent, No. 3,013,737, describes a similar set of switch controls for an automatic armature winding machine in somewhat greater detail.

As will be appreciated by those skilled in the art and as described in the aforementioned application Ser. No. 552,006, the hydraulic system described above will be capable of driving the fliers 18 and 20 in high and low forward speeds and in a low reverse speed with great precision. Further, the electric controls for the hydraulic system can be arranged or adjusted to produce practically any pattern of wind desired by rotation of the fliers 18 and 20 in association with the operation of the lead handling device 36 and the indexing mechanism 38. Because a simple timing belt arrangement is provided between each of the flier shafts 22 and 24 and the cross shaft 46 and a simple timing belt arrangement is provided between the cross shaft 46 and the hydraulic motor 64, the basic flier drive invloves a minimum number of operating parts.

With reference to FIGURES 2 and 3, it will be observed that the journal 28 for the flier shaft 24 is mounted upon a bracket 70 slidably mounted in a trackway 72 on the support plate 14. The bracket 70 is moved along the trackway 72 by an air cylinder 74 connected thereto and supported upon the support plate 14 by a fixed bracket 76. The journal 26 is simlarly mounted upon a slidable bracket which is moved along a trackway (not shown) by an air cylinder 78 (FIGURE 1). The air cylinders 74 and 78 are operated at the same time to separate the spacing between the chucks 32 and 34 to permit indexing or insertion and removal of an armature core. Because the pulleys 40 on the flier shafts 22 and 24 are also separated, as indicated by the phantom lines 40a in FIGURE 1, it will be apparent that the timing belts 42, which must be sufficiently taut to accurately and positively drive the flier shafts 22 and 24, will be stretched upon actuation of the air cylinders 74 and 78 to separate the chucks 32 and 34. For this reason, and in accordance with this invention, the timing belts 42 are designed to be slack except when the fliers 18 and 20 are being driven. The slack in the timing belts 42 is taken up by a tensioning device including a tensioning roller 80 mounted for rotation about an axis parallel to the flier shaft 24 upon a lever formed by a pair of plates 82 which in turn are pivotally mounted upon a support bracket 84 on the support plate 14. The lever further includes a plate 86 interconnecting the free ends of the plates 82, which plate is engaged by a piston rod or ram 88 driven along a vertical path by an air actuator or cylinder 90 depending from the support plate 14. The air actuator 90 retains the piston rod 88 in a retracted position whereupon the tensioning roller 80 occupies the position indicated by phantom lines 80a in FIGURE 3 unless the fliers 18 and 20 are being rotated.

Energization of the air cylinder 90 can be accomplished by entirely conventional electric circuit controlled air values. The electric circuit for timing the air cylinder 90 may include, for example, one of the coil cycle switches 240, 242, and 244 for energizing the air cylinder 90 to retract the ram 88 when the armature being wound is to be indexed, and one of the armature cycle switches 256 when the chucks 32 and 34 are to be fully separated to permit removal of a wound armature. Of course, other switch means (not shown) could be used. Since controls for actuators, such as the air cylinder 90, are so conventional, the specific controls are not shown herein.

Although the presently preferred embodiment of the device has been described, it will be understood that within the purview of this invention various changes may be made in the form, details, proportion and arrangement of parts, the combination thereof and mode of operation, wihch generally stated consist in a device capable of carrying out the objects set forth, as disclosed and defined in the appended claims.

Having thus described my invention, I claim:

1. In an armature winding machine of the type having a pair of rotatable flier shafts, drive means rotating said shafts, means intermittently moving said shafts axially toward and away from one another, and wherein said drive means includes a pair of drive pulleys, a pair of driven pulleys, one on each of said flier shafts, a pair of timing belts, one timing belt being drivingly connected to one of said drive pulleys and one of said driven pulleys, the other of said timing belts being drivingly connected to the other of said drive pulleys and the other of said driven pulleys, the improvement wherein said timing belts are longer than required to positively engage said driven pulleys whereupon said timing belts are not stretched upon axial movement of said flier shafts, and a pair of slack reducing means are provided to artifically increase the belt paths between said drive pulleys and said driven pulleys when said driven pulleys are at a substantially minimum separation from said drive pulleys.

2. The structure of claim 1 including a pair of actuator means operated in timed relation to axial movement of said flier shafts and connected to said slack reducing means for causing said slack reducing means to engage said belts when said driven pulleys are at a minimum separation from said drive pulleys.

3. The structure of claim 2 wherein one of said pair of slack reducing means includes a belt engaging roller element, a pivotal lever supporting said roller element for rotation, and wherein said actuator means includes a movable element engaging said pivotal lever.

4. The structure of claim 3 wherein said movable element is the ram of an air cylinder.

References Cited
UNITED STATES PATENTS

| | | | |
|---|---|---|---|
| 96,718 | 11/1869 | Meriam | 74—219 XR |
| 315,202 | 4/1885 | Willford | 74—227 |
| 1,325,020 | 12/1919 | Larmore | 74—242.11 |
| 1,339,893 | 5/1920 | Johnson | 74—242.11 |
| 1,949,119 | 2/1934 | Gibbs | 74—227 XR |
| 2,876,549 | 3/1959 | Adamson et al. | |
| 3,108,482 | 10/1963 | Polzin | 74—228 XR |
| 3,140,620 | 7/1964 | Ferara | 74—221 |
| 3,238,802 | 3/1966 | Budzyn | 74—219 |
| 3,262,330 | 7/1966 | Cheatum | 74—227 |

FRED C. MATTERN, JR., *Primary Examiner.*

J. A. WONG, *Assistant Examiner.*